United States Patent
Wall et al.

(10) Patent No.: US 9,517,733 B2
(45) Date of Patent: Dec. 13, 2016

(54) MOTOR VEHICLE HAVING A RETRACTABLE SCREEN

(71) Applicant: AUDI AG, Ingolstadt (DE)

(72) Inventors: Christian Wall, Hitzhofen (DE); Stefan Richter, Dresden (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/906,890

(22) PCT Filed: Jul. 23, 2014

(86) PCT No.: PCT/EP2014/002013
§ 371 (c)(1),
(2) Date: Jan. 21, 2016

(87) PCT Pub. No.: WO2015/010786
PCT Pub. Date: Jan. 29, 2015

(65) Prior Publication Data
US 2016/0159292 A1 Jun. 9, 2016

(30) Foreign Application Priority Data
Jul. 26, 2013 (DE) .......... 10 2013 012 473

(51) Int. Cl.
*B60R 11/00* (2006.01)
*B60R 11/02* (2006.01)
(Continued)

(52) U.S. Cl.
CPC ........... *B60R 11/0235* (2013.01); *B60K 35/00* (2013.01); *B60K 37/04* (2013.01); *B60R 13/0256* (2013.01); *B60K 2350/405* (2013.01); *B60R 2011/0005* (2013.01); *B60R 2011/0082* (2013.01); *B60R 2011/0085* (2013.01); *B60R 2011/0092* (2013.01); *B60R 2013/0287* (2013.01)

(58) Field of Classification Search
CPC ................ B60R 2011/0005; B60R 2011/0007; B60R 11/0229; B60R 11/0235; B60R 11/0252; B60K 37/02; B60K 37/04
USPC .................................. 296/24.34, 37.8, 37.12
See application file for complete search history.

(56) References Cited

U.S. PATENT DOCUMENTS 8,072,743 B2 * 12/2011 Kissel ................ B60R 11/0235
224/483
2005/0006918 A1 * 1/2005 Neumann ........... B60R 11/0235
296/24.34

FOREIGN PATENT DOCUMENTS

DE 689 05 061 T2 6/1993
DE 199 38 690 A1 2/2001
(Continued)

OTHER PUBLICATIONS

International Search Report for PCT/EP2014/002013; dated Oct. 27, 2014.
(Continued)

*Primary Examiner* — Dennis H Pedder
(74) *Attorney, Agent, or Firm* — Staas & Halsey LLP

(57) ABSTRACT

A trim part of a motor vehicle has a gap into which a display device with a screen can be retracted into the interior of the trim part in a covered position. The screen projects into a passenger compartment of the motor vehicle in a use position by moving through the gap from the covered position with a pivot movement. The screen is suspended in the trim part by one or more coupling mechanisms supporting the pivot movement.

10 Claims, 1 Drawing Sheet

(51) Int. Cl.
*B60K 35/00* (2006.01)
*B60K 37/04* (2006.01)
*B60R 13/02* (2006.01)

(56) References Cited

FOREIGN PATENT DOCUMENTS

| | | |
|---|---|---|
| DE | 600 20 192 T2 | 1/2006 |
| DE | 600 17 490 T2 | 2/2006 |
| DE | 10 2007 033 534 A1 | 1/2009 |
| DE | 10 2009 007 991 A1 | 8/2010 |
| DE | 10 2009 040 702 A1 | 3/2011 |
| DE | 102008015275 | * 12/2011 |
| DE | 102013012473.5 | 7/2013 |
| EP | 2014/002013 | 7/2014 |
| WO | 2008/031812 A1 | 3/2008 |
| WO | 2009/138353 A1 | 11/2009 |
| WO | 2013/146161 A1 | 10/2013 |

OTHER PUBLICATIONS

International Preliminary Report on Patentability for PCT/EP2014/002013; dated Aug. 18, 2015.
English Translation of International Preliminary Report on Patentability by WIPO for PCT/EP2014/002013 mailed Jan. 28, 2016.

* cited by examiner

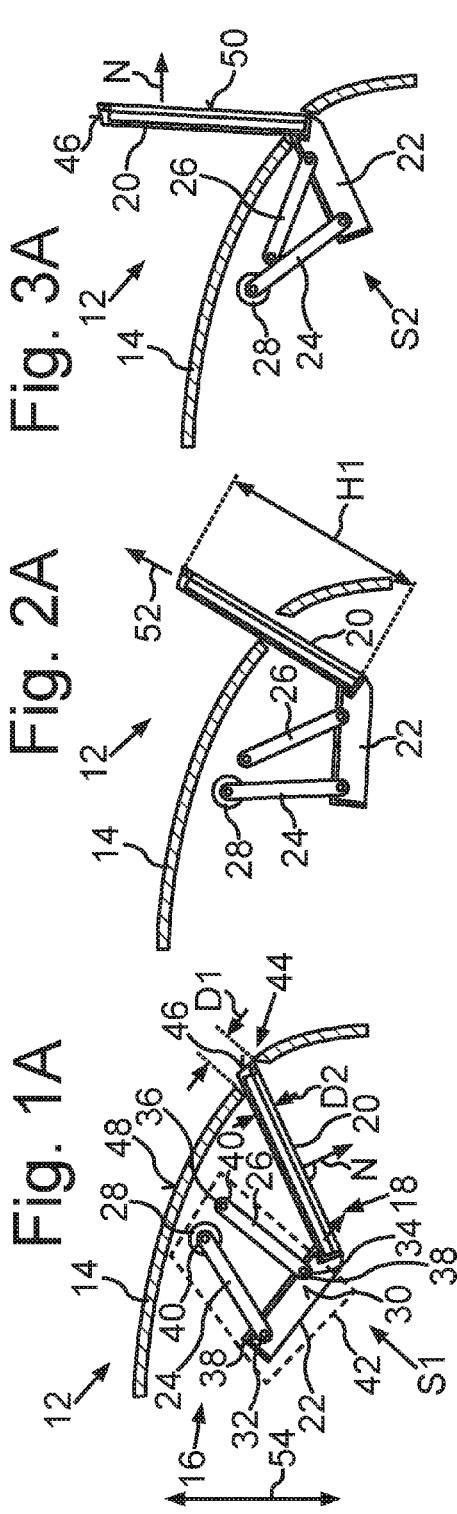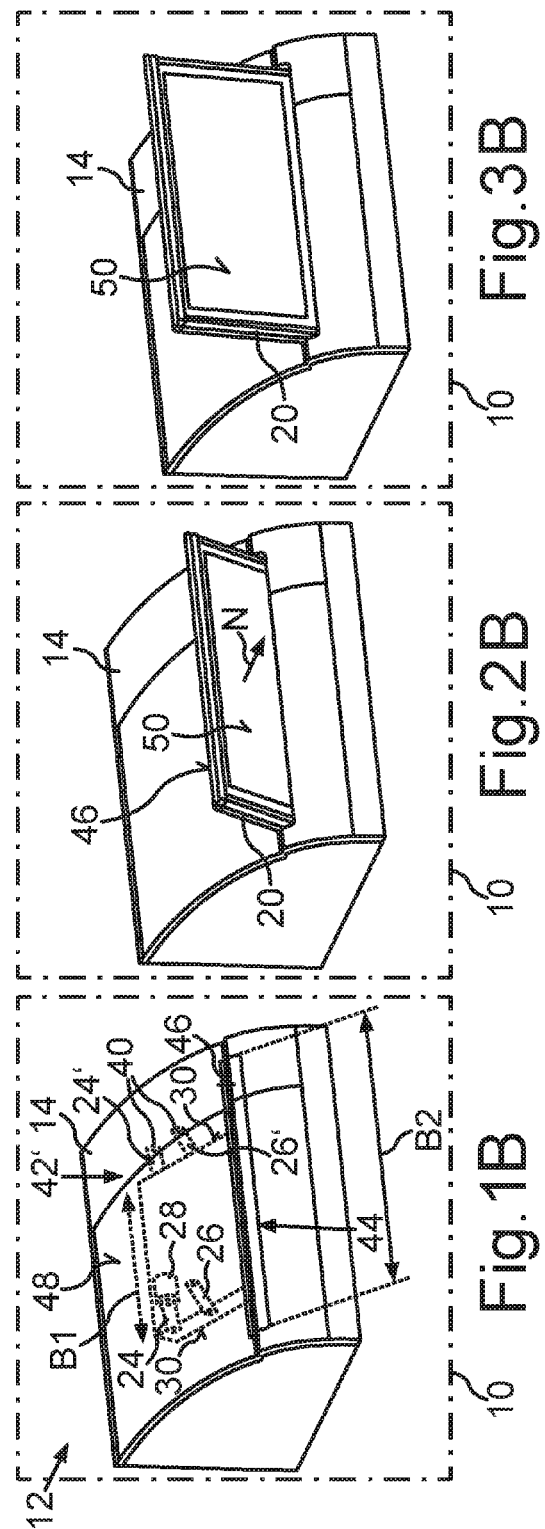

MOTOR VEHICLE HAVING A RETRACTABLE SCREEN

CROSS REFERENCE TO RELATED APPLICATIONS

This application is based on and hereby claims priority to International Application No. PCT/EP2014/002013 filed on Jul. 23, 2014 and German Application No. 10 2013 012 473.5 filed on Jul. 26, 2013, the contents of both are hereby incorporated by reference.

BACKGROUND

Described below is a motor vehicle in which a screen of a display apparatus can be retracted into and extended out of a trim part, for example a dashboard or a center console. A screen of this kind is known, for example, from DE 10 2009 007 991 A1.

According to DE 10 2009 007 991 A1, the screen is retracted into an interior of the trim part in a covered position and is directed into a passenger compartment of the motor vehicle in a use position. In order to move the screen between its use position and its covered position, the screen is extended or retracted through a gap in the trim part. In order to ensure that the screen carries out a predetermined pivot movement in the process, the screen has to be guided by a slotted guide at its sides. The provision of a slotted guide for laterally guiding the screen makes the display device undesirably wide.

In this respect, DE 10 2007 033 534 A1 discloses guiding the screen by a rail which is formed in a rear face of a housing of the screen. A slide which is connected to the trim part engages into the rail. In order to be able to exert a force onto the screen for extension purposes, a second lever in which a guide slot has to be formed is required so that the point at which force is transmitted from the lever to the screen is displaced along the lever as the screen moves out of the gap. The guide slot can become worn owing to the friction produced when the force is transmitted, and therefore play is created.

DE 600 20 192 T2 discloses a screen, which can be retracted into a trim part, for a motor vehicle in which force is transmitted between a drive motor and the screen by plates in which helical or spiral guide slots are formed. Owing to the relatively short lever paths however, a correspondingly higher force likewise acts on the walls of the guide slots, and therefore the plates have to be formed from a relatively solid material so that the guide slots do not become wider owing to wear and play is not produced as a result, it being possible for the play to lead to rattling when traveling over rough terrain.

SUMMARY

Describe below is a display device with an extendable screen in a trim part in a motor vehicle, wherein the display device is intended to exhibit a low level of wear and to be of compact construction.

In the motor vehicle, a display device is designed, in a similar manner to that in the related art, in such a way that a screen can be moved out of a trim part from a covered position in the interior of the trim part to a use position through a gap in the trim part, that is to say in a dashboard or a center console for example, and therefore the screen projects into a passenger compartment of the motor vehicle, that is to say the display area of the screen for displaying graphical image contents on a display area extends vertically in the passenger compartment for example. The screen executes a respective pivot movement when it is extended out of the trim part and retracted back into the trim part, that is to say the screen is not extended in a straight line vertically upward out of the gap and, respectively, retracted back into the gap, but rather an upper edge of the screen executes, for example, an initially obliquely upwardly directed movement when it is extended, the movement then leading in an arcuate manner upward in the direction toward the end position for the use position.

The screen is suspended in the trim part by at least one coupling mechanism in order to generate the pivot movement. This results in the advantage that all of the mechanical parts which are provided for mounting the screen and pivoting the screen in the trim part can be narrower than the screen is wide. In addition, only rotary joints which exhibit relatively low levels of wear are required for realizing a coupling mechanism. In the simplest and therefore most robust embodiment, each coupling mechanism may be a four-joint coupling mechanism.

In this case, provision is made, in particular, for at least one of the coupling mechanisms to have two pivot elements, each of which can be designed as a bar or a plate, for example. In general, the meaning of pivot element here is an inherently rigid element which acts as a gear mechanism element of the coupling mechanism and which is coupled in a rotatable manner to a further part at two opposite ends by a bearing device, for example a rotary joint, in each case. In this case, each pivot element is fastened to a carrier plate by way of one of its bearing devices, the screen being mounted on the carrier plate in a rotationally fixed manner. Each pivot element is mounted in a rotatable manner on the trim part by way of the respectively other bearing device. Therefore, in this way, the carrier plate is then arranged, on the whole, in a pivotable manner in the interior of the trim part. The carrier plate therefore forms a coupling element of the coupling mechanism.

A coupling mechanism may be provided on opposite sides of the carrier plate in each case. This results in a particularly torsionally rigid suspension. There are therefore two pivot elements on each side in this case, each of the pivot elements, by way of one end, being mounted in a rotatable manner on the carrier plate by one bearing device of the pivot element and on the trim part by the other bearing device of the pivot element.

The distance between the bearing devices of the two pivot elements, which bearing devices are mounted on the trim part, may be smaller than the distance between the bearing devices on the carrier plate in this case. The resulting lever action or implementation of the crank gear mechanism allows the display device to be particularly compact.

In order to transmit a drive force for the pivot movement of the screen to the screen, the carrier plate of one of the pivot elements may be coupled in a rotatable manner to the trim part by an electric rotary motor and a gear mechanism of the rotary motor, for example a toothed gear mechanism, on at least one side. Therefore, in this case, the rotary motor, together with its gear mechanism, forms one of the bearing devices. The gear mechanism can also be an integral constituent part of the rotary motor (geared motor). The driven pivot element in this case forms a crank in the coupling mechanism which, in this case, converts a rotary movement of the rotary motor into the pivot movement which is then transmitted to the screen according to the design of the coupling mechanism. The second pivot element, which is located on the same side of the carrier plate, then acts as a swing arm.

In the motor vehicle, the use of one or more coupling mechanisms means that the carrier plate, together with the screen which is fastened to it, is already suspended in such a stable manner that the carrier plate and the screen are mechanically mounted in the trim part solely by the at least one pivot element according to one embodiment. In this case, signals and electrical energy can be transmitted by flexible cables. The sole use of pivot elements for mechanical mounting means there is a particularly low level of wear in comparison to the use of, for example, rails or guide slots. In other words, the display device therefore may be mounted in the trim part without a rail and/or without a guide slot. This also makes the design of the display device particularly narrow in the longitudinal direction of the gap since there is no need for parts which protrude beyond a length of the gap in the longitudinal direction and are required for the slotted guide or rail guide.

The course of the pivot movement can also be adjusted in a highly accurate manner by way of one or more coupling mechanisms. It is possible for the size of the gap, that is to say the gap width of the gap (in contrast to the relatively large gap length) to be selected to be particularly low. In this case, the gap width is measured as the distance between the two walls, which delimit the gap, along a normal vector perpendicular to the display area of the screen in the use position. The gap width may have a ratio in a range of between 1.0 and 1.5 in relation to the screen thickness along the normal vector. In other words, the gap is only marginally wider than and up to 1.5 times as wide as the screen thickness. This results in the advantage that there is also no intermediate space between the screen on the one hand and the walls of the gap on the other hand during the pivot movement, a user of the display device being able to look into the interior of the trim part through the intermediate space or, for example, crumbs or other small objects being able to fall into the interior of the trim part through the intermediate space.

A further advantageous embodiment makes provision for a wall of the screen to close the gap in the covered position, that is to say when the screen is retracted into the interior of the trim part. To this end, the screen may be retracted so far into the gap that the narrow side of the screen terminates with a surface of the trim part which adjoins the gap. A separate cover for closing the gap can be dispensed with as a result.

A further major advantage of the motor vehicle described below is that a dimension of the carrier plate can be selected independently of a dimension of the screen. The screen only has to be able to be fixedly connected to the carrier plate, and electrical connections of the screen have to be able to be connected to a control circuit for the screen by way of a circuit board which may be arranged on the carrier plate. It is therefore possible for the same type of carrier plate and therefore the same type of coupling mechanism to be installed in different types of motor vehicle, in which different types of screen are intended to be used, with the display device. In this case, the dimension of the carrier plate in a longitudinal direction of the gap may be smaller than or at most equal to a dimension of the screen in the longitudinal direction. The screen therefore forms the widest component of the display device in the longitudinal direction of the gap, this generally corresponding to the transverse direction of the vehicle. Therefore, further electrical and electronic components of the motor car can be arranged in the immediate vicinity of the gap, such as operator control elements for an air conditioning system or else keys for operating an infotainment system for example.

The motor vehicle may be a motor car, in particular as a passenger car.

BRIEF DESCRIPTION OF THE DRAWINGS

These and other aspects and advantages will become more apparent and more readily appreciated from the following description of a specific exemplary embodiment, taken in conjunction with the accompanying drawings of which:

FIG. 1A is a cross section and FIG. 1B is a perspective view of an embodiment of the motor vehicle with a screen of a display device arranged in a covered position;

FIG. 2A is a cross section and FIG. 2B is a perspective view of the motor vehicle from FIG. 1 with the screen moved in a straight line into the interior of the vehicle through a gap; and FIG. 3A is a cross section and FIG. 3B is a perspective view of the motor vehicle from FIG. 1 with the screen in a use position.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

In the exemplary embodiment, the described components of the embodiment are each individual features that can be considered independently of one another and that each also develop independently of one another and therefore can also be considered to be a constituent part individually or in a different combination than that shown. Furthermore, the embodiment described can also be augmented by further features from amongst those already described.

FIG. 1B shows a perspective view of an interior 12 of a motor vehicle in a lower part of a motor vehicle 10, it being possible for the interior to contain a trim part 14, for example a center console, a dashboard or a curved trim part which is generally called a dome and can be located beneath the windshield. FIG. 1A shows a cross section through the trim part 14 with a display device 18 located in the interior 16 of the trim part 14. The display device 18 can have a screen 20, a carrier plate 22, two pivot elements 24, 26 and an electric drive motor 28.

The screen 20 can be fixedly connected to the carrier plate 22. An electronics system for operating the screen 20 can be arranged on the carrier plate 22 or integrated into the carrier plate. The screen 20 can, for example, be fitted onto an electrical connection of the carrier plate 22.

The pivot elements 24, 26 can, for example, be rods or plates. The pivot elements 24, 26 are held by rotary joints 32, 34 on one side 30 of the carrier plate 22. Two further pivot elements 24', 26' can likewise be arranged on the carrier plate 22 by rotary joints on an opposite second side 30' of the carrier plate 22. The pivot elements 24, 26, 24', 26' can be connected to the trim part 14 in a suspension region (not illustrated). As a result, the carrier plate is suspended from the pivot elements in the trim part 14. The pivot element 24 can be connected to a gear mechanism of the electric motor 28, so that a rotor of the electric motor 28 can rotate the pivot element 24 about a rotation axis by the gear mechanism. The pivot element 26 can be connected in a rotatable manner to a fixed constituent part of the trim part 14 by a rotary joint 36 for example. Therefore, overall, the respectively opposite ends 38, 40 are mounted in a rotatable manner in the case of each pivot element 24, 26, 24', 26', wherein the ends 38 are mounted in a rotatable manner on the carrier plate 22, and the ends 40 are mounted in a rotatable manner on the trim part 14. Therefore, overall, the pivot elements 24, 26 and the carrier plate 22 form a simple four-joint system 42 and, accordingly, the pivot elements 24' and 26' and the carrier plate 22 also form a further four-joint system 42'. The screen 20 can be extended through a gap 44 in the trim part 14 by rotating the shaft of the electric motor 28, that is to say by operating the electric motor 28, by the coupling mechanism which is formed by the four-joint systems 42, 42'.

FIGS. 1A and 1B illustrate the screen 20 in a covered position S1 in which a top face 46 of the screen 20 can terminate flush with an outer surface 48 of the trim part 14, so that the gap 44 is closed by the top face 46.

The screen 20 is moved to a use position S 2 (see FIGS. 3A and 3B) with a pivot movement 52 (see FIGS. 2A and 2B) by activating the electric motor 28 when the screen 20 is in its covered position S1 in which a display area 50 is located completely in the interior 16 of the trim part 14. The meaning of "in the interior" is that the screen, apart from its top face 46, is located behind the outer surface 48 of the trim part 14, as seen from the interior of the vehicle, in the covered position S1. In the use position S2, the screen 20 projects into the interior 12 of the vehicle, so that the display area 50 can be seen by a user. The screen 20 can then be retracted back into the trim part 14 from the use position S2 to the covered position S1 by a reversed rotary movement of the shaft of the electric motor 28. The pivot movement 52 can be adjusted by selecting the distances between the respective rotary joints 38, 40 and selecting the length of the pivot elements 24, 26 and 24', 26'. A distance between the rotary joints 38 on the carrier element 22 on the one hand and a distance between the rotary joints 40 on sides of the trim part 14 on the other hand can be different on each side 30, 30' of the carrier element 22. In particular, the distance between the rotary joints 40 is smaller than the distance between the rotary joints 38.

A width B1 of the carrier plate 22 can be smaller than or equal to a screen width B2 of the screen 20 in a longitudinal direction of an elongate extent of the gap 44. Therefore, the sides 30, 30' do not protrude beyond the edges of the screen 20 in the direction of the screen width B2, which corresponds to the transverse direction of the vehicle in this case. In other words, the sides 30, 30' are in alignment with the edges of the screen 20 or, if B1<B2, the sides of the screen 20 protrude beyond the carrier plate 22 in the direction of the screen width B2, that is to say the gap length.

A ratio of a gap width D1 in relation to a screen thickness D2 can be in a range of greater than 1.0 up to 1.5. The gap width D1 and the screen thickness D2 lie along a direction of a surface normal N of the display area 50 of the screen 20 in the use position S2 in this case. The screen thickness D2 can, in particular, be constant along a full screen height H1.

The example allows display staging for a screen 20 and an associated simple kinematics system 42, 42' in which a relatively thin display 20 (the screen thickness D2 may be 1.5 cm or less) is extended from a dashboard 14 which manages without an additional cover. A specially designed four-joint kinematics system is used in this case. The four-joint kinematics system takes into account the parameters of the display thickness D2, the extension curve 52, the size of the extension gap D1 and allows a particularly low physical height 54 of the entire mechanical unit in the retracted state overall. The entire kinematics system is situated behind the display 20. Therefore, the display 20 which is visible to the user is not artificially widened. Furthermore, this kind of kinematics system is suitable for being able to accommodate different display widths with the same mechanics. Only the ratio B1 to B2 is changed in this case.

Overall, the example shows how the following advantages can be obtained. A slim display 20 with a low thickness D2 can be used, without a significant intermediate space remaining between the top face 46 and the surrounding boundary of the gap 44 in the covered position S1. Simple, robust mechanics by a simple four-joint system can be used. The screen kinematics system is independent of the screen width since the kinematics system is produced solely on the carrier plate 22 and the pivot elements 24, 26, 24', 26' and independently of the screen width B2. An additional cover for closing the gap 44 when the screen is retracted is not required. The extension curve according to the pivot movement 52 can be shaped by the design of the pivot elements 24, 26, 24', 26' and, as a result, can be designed in an attractive and elegant manner. A low total physical height 54 is produced in the retracted state overall.

The described advantages are also achieved with a slotted guide being completely dispensed with. The display thickness or screen thickness D2 does not have to be matched to the kinematics system in order to be able to close the gap 44. It is possible to use a particular flat display as a result. The rotary movement 52 can be implemented in a very simple, robust manner with only three parts, specifically the drive lever (pivot element 24), intermediate lever (carrier plate 22) and output lever (pivot element 26).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2D1865 (Fed. Cir. 2004).

The invention claimed is:

1. A motor vehicle having a passenger compartment with a trim part, the trim part having an interior and an exterior with a gap in the exterior, said motor vehicle comprising:
    a display screen retracting into the interior of the trim part in a covered position and projecting into the passenger compartment of the motor vehicle in a use position by pivoting through the gap in the trim part; and
    at least one coupling mechanism supporting said display screen and enabling the pivoting thereof, said at least one coupling mechanism including
        at least two pivot elements, each of the pivot elements having first and second ends with the first end mounted in a rotatable manner on the trim part, and
        a carrier plate having a leading surface, adjacent the bottom of the display screen, with a longest measurement substantially parallel to a longest dimension of the gap, the carrier plate mounted in a pivotable manner in the interior of the trim part at the second ends of the at least two pivot elements, providing a coupling element of said at least one coupling mechanism and having said display screen cantilevered from the carrier plate, the carrier plate and said display screen being mechanically mounted in the trim part solely by the at least two pivot elements.

2. The motor vehicle as claimed in claim 1, wherein each coupling mechanism has four elements.

3. The motor vehicle as claimed in claim 1,
    further comprising at least one rotary or geared motor having a gear mechanism, and
    wherein at least one of the pivot elements is coupled in the rotatable manner to the trim part by the gear mechanism of the at least one rotary or geared motor, and as a result acts as a crank in the coupling mechanism.

4. The motor vehicle as claimed in claim 1,
wherein said display screen is supported only by said at least one coupling mechanism, and
wherein said display screen has sides, transverse to the gap in the trim part, and a rear face, without a rail on the rear face, and without a guide slot on the sides.

5. The motor vehicle as claimed in claim 1, wherein the gap has a gap width measured between walls which delimit the gap, along a normal vector perpendicular to a display surface of said display screen in the use position, the gap width ranging between 1.0 and 1.5 times a thickness of said display screen measured along the normal vector.

6. The motor vehicle as claimed in claim 1, wherein said display screen has a side wall substantially closing the gap in the covered position.

7. The motor vehicle as claimed in claim 1,
wherein the longest measurement of the carrier plate in a longitudinal direction of the gap is not larger than a length of the bottom of said display screen in the longitudinal direction.

8. The motor vehicle as claimed in claim 1, wherein, as viewed from an observation point from which a display area of said display screen can be seen from the passenger compartment in the use position, all of said at least one coupling mechanism, provided for mounting said display screen in the trim part, is arranged behind said display screen without protruding beyond said display screen laterally along a transverse axis of the vehicle.

9. The motor vehicle as claimed in claim 1, wherein each of the at least two pivot elements have a center line extending linearly between the first and second ends.

10. The motor vehicle as claimed in claim 1, wherein each of the at least two pivot elements has
respective first and second pivot axes at the first and second ends separated by a pivot arm length, and
an upper surface, closer to the trim part in the use position than in the covered position, containing at least one line segment at least as long as the pivot arm length.

* * * * *